(12) United States Patent
Zhang et al.

(10) Patent No.: US 7,046,478 B2
(45) Date of Patent: May 16, 2006

(54) METHOD AND APPARATUS FOR REDUCING VIBRATION IN A DYNAMIC SYSTEM

(75) Inventors: Tao Zhang, Shakopee, MN (US); Kenneth Arthur Haapala, Plymouth, MN (US); John Christopher Morris, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 270 days.

(21) Appl. No.: 10/411,712

(22) Filed: Apr. 11, 2003

(65) Prior Publication Data

US 2005/0259348 A1    Nov. 24, 2005

(51) Int. Cl.
  *G11B 5/596* (2006.01)
(52) U.S. Cl. ................ 360/77.08; 360/78.09
(58) Field of Classification Search ............ 360/77.08, 360/75, 77.02, 77.04, 77.07, 78.04, 78.09; 318/573, 594, 601, 609–610
See application file for complete search history.

(56) References Cited

U.S. PATENT DOCUMENTS

| | | | | |
|---|---|---|---|---|
| 5,325,247 A | | 6/1994 | Ehrlich et al. ............ | 360/78.09 |
| 5,721,648 A | * | 2/1998 | Phan et al. ............... | 360/77.08 |
| 5,786,951 A | | 7/1998 | Welland et al. | |
| 5,875,158 A | | 2/1999 | Schell | |
| 6,153,998 A | * | 11/2000 | Takakura .................... | 318/609 |
| 6,219,196 B1 | | 4/2001 | Semba et al. | |
| 6,246,723 B1 | | 6/2001 | Bliss et al. | |
| 6,314,473 B1 | | 11/2001 | Singer et al. | |
| 6,496,323 B1 | * | 12/2002 | Umeda et al. ........... | 360/78.09 |
| 6,545,836 B1 | * | 4/2003 | Ioannou et al. .......... | 360/77.08 |
| 6,574,070 B1 | * | 6/2003 | Gregg ..................... | 360/78.09 |
| 6,590,734 B1 | * | 7/2003 | Ell .......................... | 360/78.09 |
| 6,614,618 B1 | * | 9/2003 | Sheh et al. ............... | 360/78.09 |
| 6,704,160 B1 | * | 3/2004 | Takakura ................. | 360/78.09 |
| 6,785,080 B1 | * | 8/2004 | Sun et al. ...................... | 360/75 |
| 6,785,087 B1 | * | 8/2004 | Saito ....................... | 360/77.08 |
| 6,822,415 B1 | * | 11/2004 | Komiya et al. ............. | 318/609 |
| 2001/0052035 A1 | | 12/2001 | Singer et al. | |
| 2002/0041459 A1 | | 4/2002 | Singer et al. | |
| 2002/0041460 A1 | | 4/2002 | Singer | |
| 2002/0176192 A1 | * | 11/2002 | Chung .......................... | 360/46 |
| 2004/0094338 A1 | * | 5/2004 | Skurnik ................... | 178/18.01 |

FOREIGN PATENT DOCUMENTS

| | | |
|---|---|---|
| JP | 08126370 A * | 5/1996 |
| WO | WO 99/45535 | 9/1999 |

* cited by examiner

*Primary Examiner*—David Hudspeth
*Assistant Examiner*—James L Habermehl
(74) *Attorney, Agent, or Firm*—David K. Lucente; Derek J. Berger

(57) ABSTRACT

An apparatus and method for controlling a dynamic system is provided in which primary position control output signals are generated at a position measurement sampling frequency. Intermediate position control output signals are generated between the primary position control output signals as a function of the primary position control output signals.

20 Claims, 5 Drawing Sheets

METHOD AND APPARATUS FOR REDUCING VIBRATION IN A DYNAMIC SYSTEM

FIELD OF THE INVENTION

The present invention relates generally to reducing vibrations in various modes of a dynamic system. In particular, the present invention relates to the reduction of mechanical resonance in a dynamic system, such as a disc drive, by carrying out intermediate position control action in addition to primary position control action, which is carried out at a position measurement sampling frequency.

BACKGROUND OF THE INVENTION

Movement in dynamic systems typically results in unwanted vibrations that are both mechanical and acoustic in nature. These vibrations can have a detrimental affect on the operation of such systems. One dynamic system that is particularly sensitive to unwanted vibrations is a computer disc drive.

In a computer disc drive, data is stored on discs in concentric tracks. In disc drives with relatively high track densities, a servo feedback loop is used to maintain a head over the desired track during read or write operations. This is typically accomplished utilizing prerecorded servo information on sectors that are interspersed along a disc. During track seeking operations, position information is sampled from the sectors as the head moves from a departure track to a destination track. During track following operations, successive servo samples are taken from the servo sectors of a single data track being followed by the head under servo loop control. The sampled positional information is then compared by the digital servo control system with predicted positional location, and any deviation or error results in a correction signal applied to an actuator and resultant corrective movement of the head-carrying actuator arm.

Historically, only one actuator, typically a voice coil motor (VCM), was used to position the head. Recently, micro-actuators have been proposed that would be used in combination with the VCM to position the head. Because they are small, such micro-actuators generally have a better frequency response than the VCM. As such, they are better able to follow high frequency control signals.

The mechanical structure of the disc drive comprises various resonant modes that cause actuator oscillation during track seeking/settling operations and even during track following operations. Currently, the most widely used technique to handle such unwanted vibrations is to employ notch filters at the mechanical resonance frequencies. To implement a notch filter, the position measurement sampling frequency has to be twice as high as the resonance frequency to be notched.

In disc drives with micro-actuators included on the actuator arm, the mechanical resonance frequency may be very high (44 Kilohertz (kHz)–51 kHz, for example) and therefore the position measurement sampling frequency to implement the required notch filter will have to be extremely high (about 100 kHz). However, the sampling frequency is limited by disc spin rate, the number of servo sectors and processor speed. Therefore, to implement such notch filters, significant processing speed and processing capability is usually required. Unfortunately, higher speed sampling devices needed to implement such notch filters usually come at a high premium in cost and perhaps are not even available at the sampling rates needed.

Embodiments of the present invention provide solutions to these and other problems, and/or offer other advantages over the prior art.

SUMMARY OF THE INVENTION

The present embodiments relate to dynamic systems, such as disc drives, in which combined primary and intermediate position control action that is faster than a position measurement sampling frequency is carried out, thereby addressing the above-mentioned problems.

An apparatus and method for controlling a dynamic system is provided in which primary position control output signals are generated at a position measurement sampling frequency. Intermediate position control output signals are generated between the primary position control output signals as a function of the primary position control output signals.

Other features and benefits that characterize embodiments of the present invention will be apparent upon reading the following detailed description and review of the associated drawings.

BRIEF DESCRIPTION OF THE DRAWINGS

FIGS. 3-1 through 3-3 are plots of experimental results obtained in connection with investigating the source of excitation in a dynamic system.

FIGS. 6-1 and 6-2 show frequency response plots obtained form a simulation of a multi-rate first-order extrapolator and a zero-order hold function, respectively.

DETAILED DESCRIPTION OF ILLUSTRATIVE EMBODIMENTS

In the embodiments described below, an apparatus and method for controlling a dynamic system, such as a disc drive, is provided in which primary position control output signals are generated at a position measurement sampling frequency. Intermediate position control output signals are generated between the primary position control output signals as a function of the primary position control output signals. This results in relatively smooth control action with reduced vibration.

Figure 1:
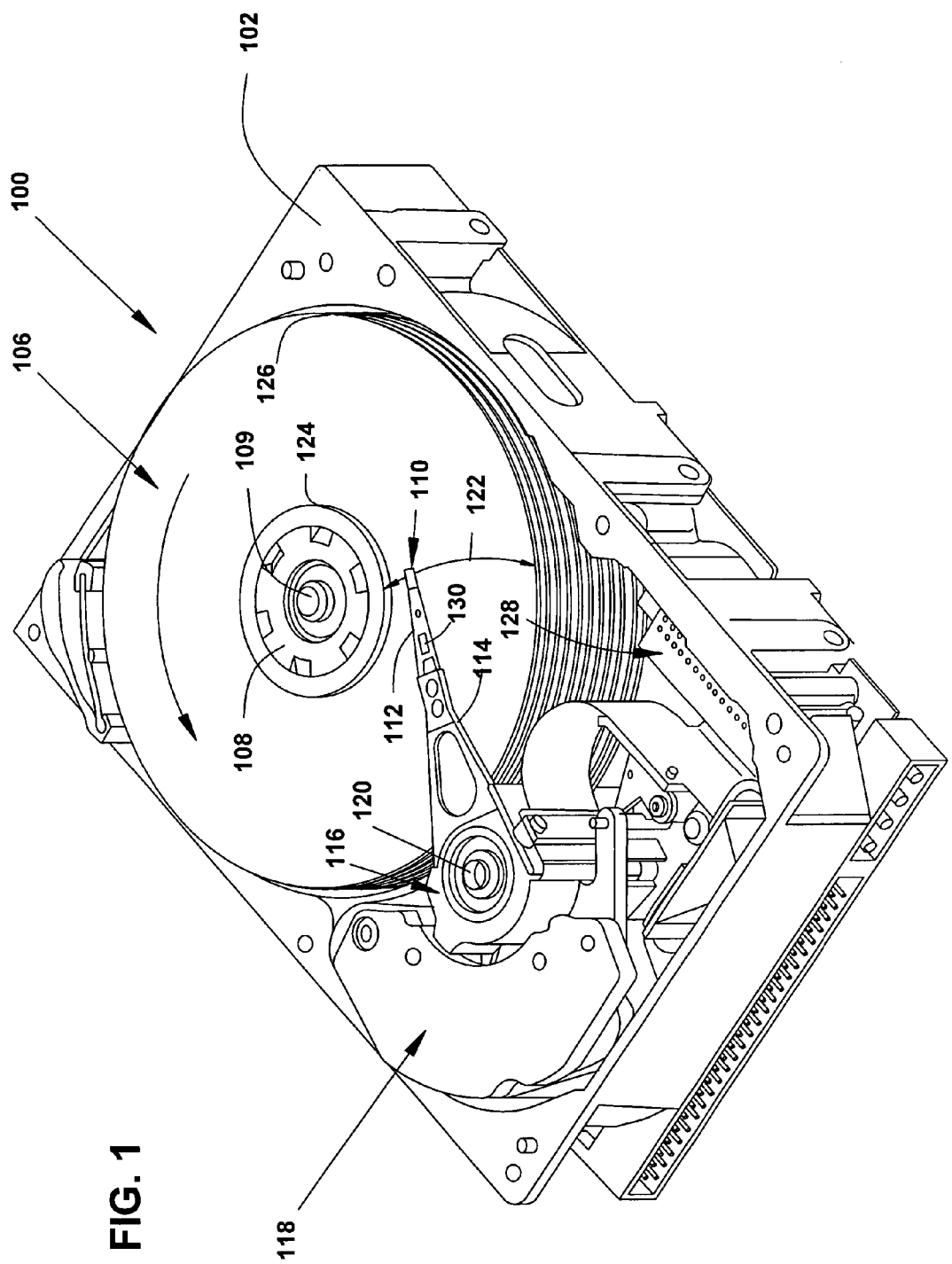
FIG. 1 is a perspective view of a disc drive in which aspects of the present invention may be practiced.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics 128 based on signals generated by heads 110 and a host computer (not shown). A micro-actuator 130, which provides fine position control of heads 110, is used in combination with VCM 118 that provides relatively coarse positioning of heads 110.

Figure 2:
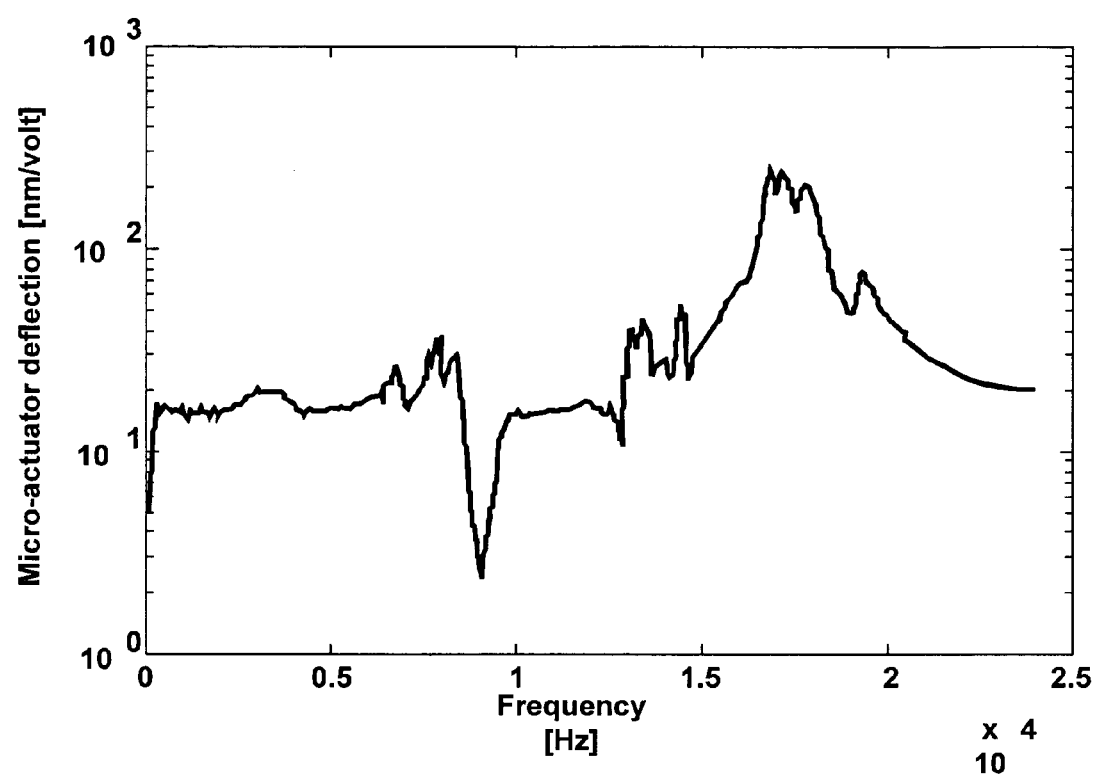
FIG. 2 is a plot showing the structural response of a disc drive micro-actuator.

As mentioned above, reduction of unwanted vibration in a disc drive is currently carried out with a notch filter, the implementation of which requires a sampling frequency that is twice as high as the resonance frequency to be notched. Further, in disc drives with micro-actuators included on the actuator arm, the mechanical resonance frequency may be very high (44 kilohertz (kHz)–51 kHz, for example) and therefore the sampling frequency to implement the required notch filter will have to be extremely high (about 100 kHz). In an example disc drive having a 48 kHz sampling rate, when a 44 kHz signal is sampled at this 48 kHz sampling rate, an alias or false frequency component will appear below the 24 kHz Nyquist frequency (half the sampling rate). The micro-actuator structural response spectrum of such a disc drive (sampled at 48 kHz sampling rate) is shown in FIG. 2. The ripple at 4 kHz that appears in the micro-actuator structural response spectrum was confirmed to be an aliasing mode of the micro-actuator 44 kHz resonance. Since this aliasing frequency is very close to the servo bandwidth, it may result in large position error signals (PES) and/or, in some instances, de-stabilization of the servo system.

Figures 1, 3:
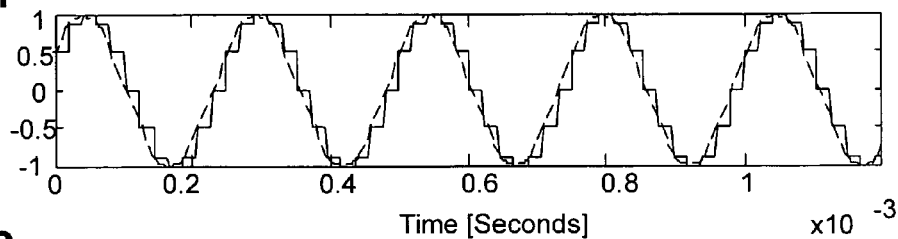
Figures 2, 3:
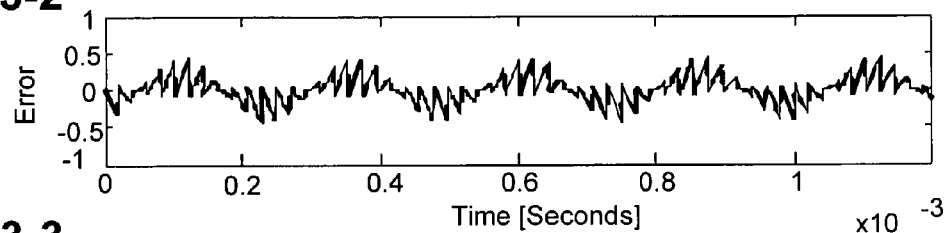
Figure 3:
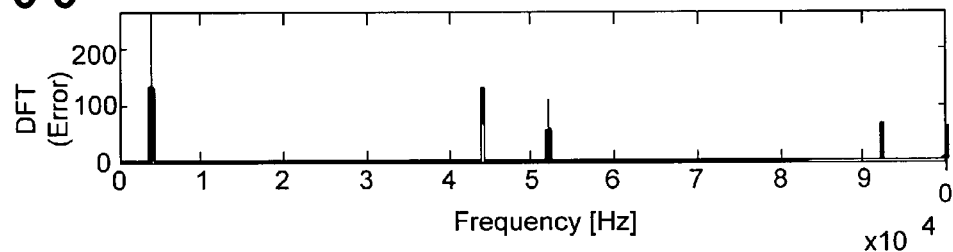

To investigate the source of the resonance excitation that caused the ripple at 4 kHz (shown in FIG. 2), an analog 4 kHz sine wave was sampled at a 48 kHz sampling rate. In FIG. 3-1, the dashed line is a plot of the 4 kHz sine wave and the solid line is a plot of the sine signal sampled at 48 kHz. The difference between the two signals is shown in the plot of FIG. 3-2. FIG. 3-3 is a plot of the Discrete Fourier transform (DFT) of the error between the 4 kHz sine wave and the sine signal sampled at 48 kHz. It can be seen that the DFT spectrum (FIG. 3-3) contains two spikes, one at 44 kHz and the other at 52 kHz. This indicates that if the micro-actuator control output contains a large number of 1–4 kHz frequency components and is updated at a 48 kHz sampling rate, there will be large excitation at high frequencies, which may excite the 44–52 kHz micro-actuator resonance. Therefore, by reducing the micro-actuator high frequency excitation, the associated aliasing problem can be alleviated.

In general, movement in dynamic systems typically results in unwanted vibrations that can have a detrimental affect on the operation of such systems. There is a need to reduce such vibrations to an acceptable level without undue computational effort and at a relatively low cost.

Under the present invention, dynamic systems are controlled by generating primary position control output signals at a position measurement sampling frequency. Intermediate position control output signals are generated between the primary position control output signals as a function of the primary position control output signals. This combined primary and intermediate position control action is faster than position control action provided at the position measurement sampling frequency and therefore results in relatively smooth control action. Although embodiments of the present invention described below relate to reducing unwanted vibration in disc drive data storage systems, the same principles may be employed for reducing vibration in other dynamic systems.

Figure 4:
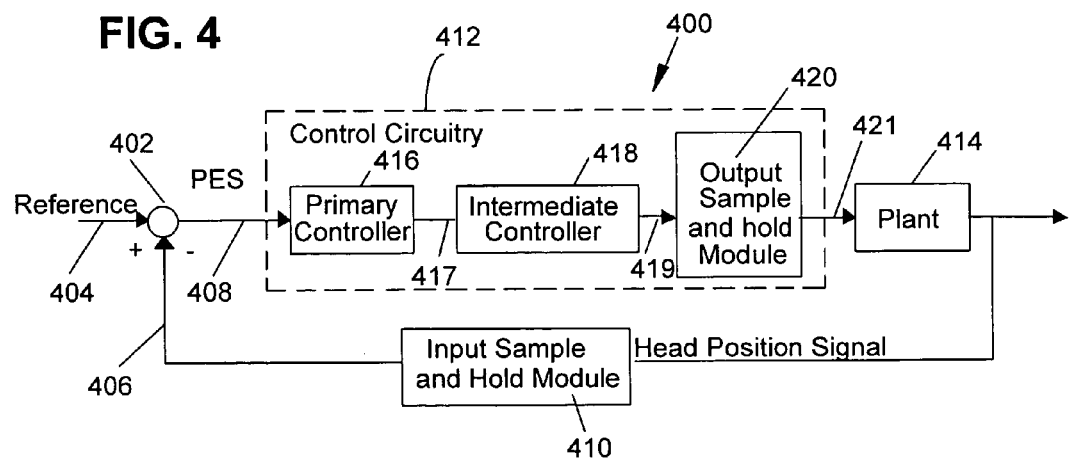
FIG. 4 is a block diagram of a disc drive servo loop with an intermediate position controller of the present invention.

Referring now to FIG. 4, a block diagram of a disc drive servo loop 400 that includes an intermediate controller 418 of the present invention is shown. Components of servo loop 400, other than plant 414, are included in servo electronics 128 (shown in FIG. 1). Plant 414 includes VCM 118 and micro-actuator 103 (FIG. 1). Because the precise structure of the servo loop is not significant to the present invention, servo loop 400 is shown in a simplified form. Those skilled in the art will appreciate that servo loops are more complex than the simple diagram of FIG. 4.

Servo loop 400 includes a summing node 402 that receives a reference signal 404 indicating the desired position for a head on the disc. Summing node 402 combines reference signal 404 with a head position signal 406 to produce a PES 408 that is provided to control circuitry 412. As can be seen in FIG. 4, control circuitry 412 includes a primary controller or primary position controller 416, intermediate controller or intermediate position controller 418 and an output sample and hold module 420. Based on PES 408, control circuitry 412 generates an output control signal 421 that is provided to plant 414 which, in turn, changes the position of the head over the disc.

Head position signal 406 is sampled at a position signal sampling frequency by an input sample and hold module 410, before it is provided to summing node 402 which, as mentioned above, combines reference signal 404 with head position signal 406 to produce PES 408. Based on PES 408, primary position controller 416 provides primary position control output signals, designated by reference numeral 417, at the position measurement sampling frequency. Intermediate position controller 418, which receives primary position control output 417, generates intermediate position control output signals as a function of the primary position control output signals. Further, intermediate position controller 418 outputs both primary and intermediate position control output signals, designated by reference numeral 419, to output sample and hold module 420 which, in turn, provides output control signal 421. This arrangement results in control action that takes place at a frequency greater than the position measurement sampling frequency. A specific example for generating the intermediate position control output such that control action takes place at twice the position measurement sampling frequency is provided below in connection with FIG. 5 and Equations 1 through 3.

Figure 5:
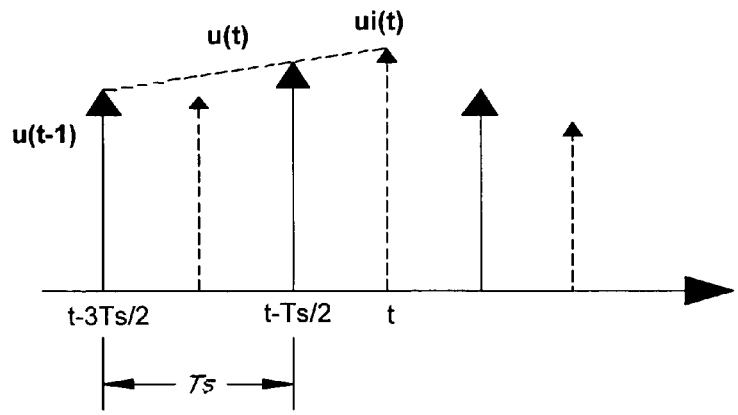
FIG. 5 is a plot illustrating control action carried out in a disc drive including an intermediate position controller having a first-order extrapolator.

FIG. 5 is a plot showing primary position control output u(t), designated by solid vertical lines, and intermediate position control output ui(t) that is designated by dashed lines. In FIG. 5, the horizontal axis represents time. Primary position control output u(t) is provided by primary position controller 416 (FIG. 4) and intermediate position control output ui(t) is produced by employing a first-order extrapolator, which is implemented in intermediate position controller 418 (FIG. 4). Primary position control output u(t) is provided at the position measurement sampling frequency. In FIG. 5, Ts is the time interval corresponding to the position measurement sampling frequency and therefore is the time interval between two consecutive primary position control output signals (two consecutive solid vertical lines in FIG. 4). Ts/2 denotes the time between two consecutive position control output signals (a solid vertical line and a dashed vertical line nearest to the solid vertical line in FIG. 4) and therefore is the sampling rate at which an up-sampled zero-order hold function (implemented in output sample and hold module 420 of FIG. 4) operates. From FIG. 5, it is clear that the position control output is updated at twice the rate of the head position sampling frequency. In this example in which the position control output is updated at twice the rate of the head position sampling frequency, the intermediate position control output or extrapolated control ui(t) is calculated by first-order approximation and expressed as:

$$ui(t) = u(t) + \frac{u(t) - u(t-1)}{2} \qquad \text{Equation (1)}$$

Based on FIG. 5 and Equation 1, the combined transfer function, ($H_1(s)$), of the first-order extrapolator and the up-sampled zero-order hold function is expressed as:

$$H_1(s) = \frac{1 - \exp\left(-\frac{T_s}{2}s\right)}{T_s s} * \frac{2 + 3\exp\left(-\frac{T_s}{2}s\right) - \exp\left(-\frac{3T_s}{2}s\right)}{2} \qquad \text{Equation (2)}$$

where * represent multiplication. In contrast with Equation (2) above, the transfer function, ($H_0(s)$), of a zero-order hold operating at a sampling rate of Ts is expressed as:

$$H_0(s) = \frac{1 - \exp(-T_s s)}{T_s s} \qquad \text{Equation (3)}$$

Figures 1, 6:
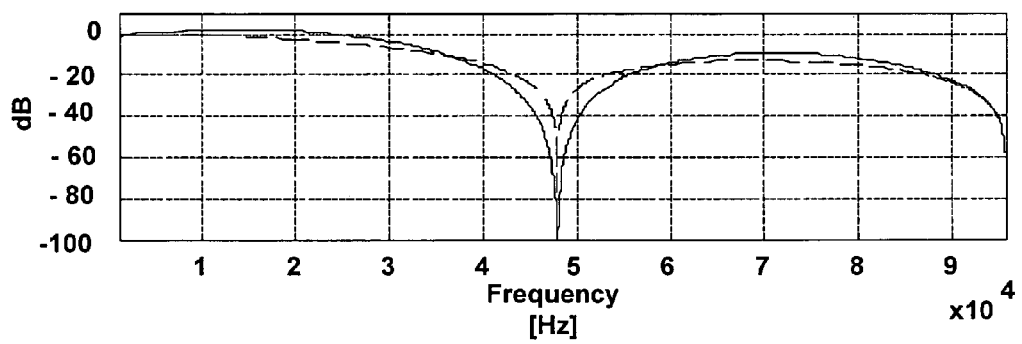
Figures 2, 6:
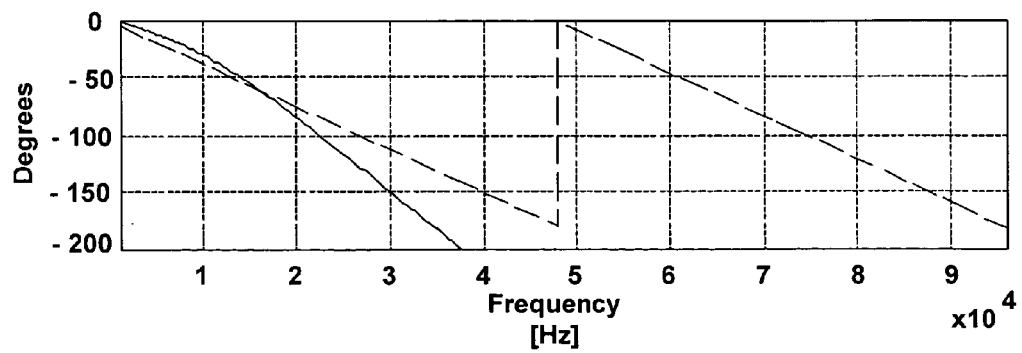

FIGS. 6-1 and 6-2 show frequency response plots obtained from a simulation of a combination of the first-order extrapolator and the up-sampled zero-order hold function described by Equations (1) and (2) (hereinafter referred to as a 2× multi-rate first-order extrapolator), and from a simulation of a zero-order hold function operating at the sampling rate of Ts (hereinafter referred to as a single-rate zero-order hold). In FIGS. 6-1 and 6-2, plots obtained in connection with the 2× multi-rate first-order extrapolator are represented by solid lines and plots obtained in connection with the single-rate zero-order hold are represented by dashed lines. From FIG. 6-1, it can be seen that the 2× multi-rate first-order extrapolator has an attenuation of at least 15 decibels (dB) more than that of the single-rate zero-order hold in the 44k–52 kHz frequency range. This implies that the 2× multi-rate first-order extrapolator is 5–6 times more effective in reducing high frequency excitation than the single-rate zero-order hold when micro-actuator resonant modes in the 44–52 kHz frequency range are present. Consequently, the 2× multi-rate first-order extrapolator can significantly reduce the aliasing effects of the above-mentioned resonance modes. In addition, from FIG. 6-2, it is clear that the 2× multi-rate first-order extrapolator has less phase drop than the single-rate zero-order hold method at a frequency of 3 kHz. This indicates that the inclusion of the 2× multi-rate first-order extrapolator increases loop phase margin and therefore can increase the robustness of a closed-loop control system.

Figure 7:
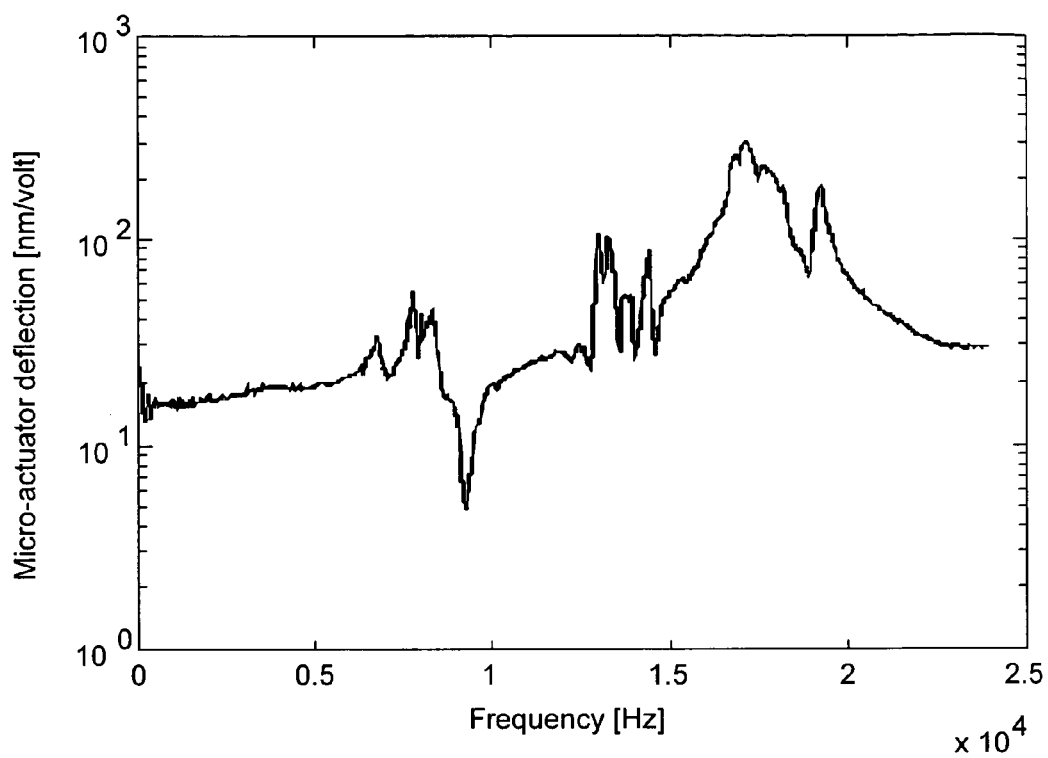
FIGS. 7 and 8 are plots illustrating results obtained by employing the intermediate position control technique of the present invention in a disc drive.

The above-described 2× multi-rate first-order extrapolator was implemented in a test disc drive. FIG. 7 shows the measured structural response of a micro-actuator of the test disc drive. Compared to the micro-actuator structural response shown in FIG. 1, obtained from a disc drive including a single-rate zero-order hold, the aliasing mode at 4 kHz is alleviated significantly in the response shown in FIG. 7. This confirms that the inclusion of the 2× multi-rate first-order extrapolator decreases the high-frequency excitation, thereby reducing problems associated with micro-actuator aliasing modes.

Figure 8:
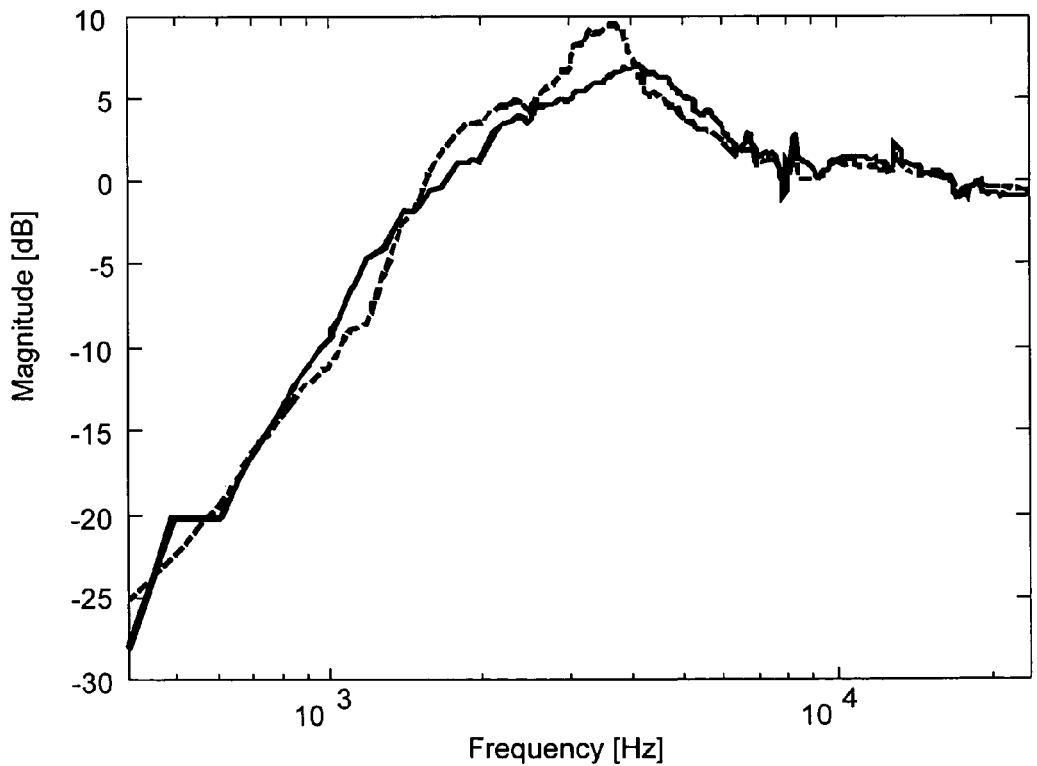

Measurements of the sensitivity functions of the test disc drive were carried out before and after the inclusion of the 2× multi-rate first-order extrapolator. Plots of the results obtained are shown in FIG. 8. The dashed line represents a plot of the sensitivity function of the drive without the 2× multi-rate first-order extrapolator and the solid line represents a plot of the sensitivity function of the drive with the 2× multi-rate first-order extrapolator included. The plots indicate that without the 2× multi-rate first-order extrapolator, the aliasing mode causes a bubble at 3–4 kHz. The inclusion of the 2× multi-rate first-order extrapolator results in the bubble being 3 dB lower.

The non-repeatable run-out (NRRO) performance of the test disc drive including the 2× multi-rate first-order extrapolator is summarized in Table 1 below.

TABLE 1

| NRRO Performance | Mean (micro inch) | Mean + 3 sigma (micro inch) | Z-score |
|---|---|---|---|
| With single-rate zero-order hold | 0.58 | 0.87 | 5.22 |
| With 2× multi-rate first-order extrapolator | 0.53 | 0.81 | 5.93 |

From the contents of Table 1, it can be seen that a 6% NRRO improvement is achieved by employing the 2× multi-rate first-order extrapolator.

The foregoing equations and examples of the present invention illustrate generating single intermediate position control output signals (such as ui(t) shown in FIG. 5) between each pair of consecutive primary position control output signals (such as u(t) and u(t−1) shown in FIG. 5). Specifically, in the above embodiment shown in FIG. 5, a current intermediate position control output signal (ui(t)) of the intermediate position control output signals is generated as a function of a pair of consecutive primary position control output signals (u(t), u(t−1)) of the primary position control output signals. The pair of primary position control output signals (u(t), u(t−1)) is provided immediately prior to the generation of the current intermediate position control output signal. However, the above principles can be extended to provide higher order multi-rate control (multiple position intermediate position control output signals between each pair of consecutive primary position control output signals). In general, N intermediate position control output signals can be generated between each pair of consecutive primary position control output signals by implementing the following equation:

$$u(t, i) = u(t) + \frac{u(t) - u(t-1)}{N} i \qquad \text{Equation (4)}$$

where u(t,i) represents the intermediate position control output signal at the $i^{th}$ sample number within sample t (within a pair of consecutive primary position control output signals).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the dynamic system while maintaining substantially the same functionality without departing from the scope and spirit of the present invention. In addition, although the preferred embodiment described herein is directed to the reduction of vibration in a disc drive data storage system, it will be appreciated by those skilled in the art that the teachings of the present invention can be applied to other dynamic systems, without departing from the scope and spirit of the present invention. Further, the intermediate position control output generation process may be implemented in hardware or software. The disc drive can be based upon magnetic, optical, or other storage technologies and may or may not employ a flying slider. Based on the foregoing, it is clear that the intermediate position control output signals can be generated at the position measurement sampling frequency, at a frequency that is greater than the position control sampling frequency, or at a frequency that is a multiple of the position control sampling frequency. It should be noted that, in a disc drive, the position measurement sampling frequency is typically a servo sampling frequency, which is a function of a number of servo sectors on a disc of the disc drive.

The invention claimed is:

1. A method of controlling a dynamic system, the method comprising:
   (a) providing primary position control output signals at a position measurement sampling frequency; and
   (b) generating an intermediate position control output signals, between the primary position control output signals, as a function of the primary position control output signals.

2. The method of claim 1 wherein the generating step (b) comprises generating the intermediate position control output signal between a pair of consecutive primary position control output signals of the primary position control output signals.

3. The method of claim 1 wherein the generating step (b) comprises generating additional intermediate position control output signals between pairs of consecutive primary position control output signals of the primary position control output signals.

4. The method of claim 1 wherein the generating step (b) comprises generating the intermediate position control output signal at the position measurement sampling frequency.

5. The method of claim 1 wherein the generating step (b) comprises generating the intermediate position control output signal at a frequency that is greater than the position measurement sampling frequency.

6. The method of claim 1 wherein the generating step (b) comprises generating the intermediate position control output signal at a frequency that is a multiple of the position measurement sampling frequency.

7. The method of claim 1 wherein the primary position control output signals being provided immediately prior to the generation of the intermediate position control output signal.

8. The method of claim 1 wherein the generating step (b) is carried out by a first-order extrapolator.

9. A disc drive implementing the method of claim 1.

10. The method of claim 9 wherein the position measurement sampling frequency is a servo sampling frequency, the servo sampling frequency being a function of a number of servo sectors on a disc of the disc drive.

11. A dynamic system comprising:
    a primary position controller configured to provide primary position control output signals at a position measurement sampling frequency; and
    an intermediate position controller configured to generate an intermediate position control output signals between the primary position control output signals as a function of the primary position control output signals.

12. The apparatus of claim 11 wherein the intermediate position controller is further configured to generate the intermediate position control output signal between a pair of consecutive primary position control output signals of the primary position control output signals.

13. The apparatus of claim 11 wherein the intermediate position controller is further configured to generate additional intermediate position control output signals between pairs of consecutive primary position control output signals of the primary position control output signals.

14. The apparatus of claim 11 wherein the intermediate position controller is further configured to generate the intermediate position control output signal at the position measurement sampling frequency.

15. The apparatus of claim 11 wherein the intermediate position controller is further configured to generate the intermediate position control output signal at a frequency that is greater than the position measurement sampling frequency.

16. The apparatus of claim 11 wherein the intermediate position controller is further configured to generate the intermediate position control output signal at a frequency that is a multiple of the position measurement sampling frequency.

17. The apparatus of claim 11 wherein the primary position control output signals being provided immediately prior to the generation of the intermediate position control output signal.

18. The apparatus of claim 11 wherein the intermediate position controller comprising a first-order extrapolator configured to generate intermediate position control output signals between the primary position control output signals as a function of the primary position output control signals.

19. The apparatus of claim 11 wherein the dynamic system is a disc drive.

20. A dynamic system comprising:
    a primary position controller configured to provide primary position control output signals at a position measurement sampling frequency; and
    an intermediate position control means for generating intermediate position control output signals between the primary position control output signals as a function of the primary position control output signals.

* * * * *